United States Patent
Durand

(10) Patent No.: US 7,441,453 B2
(45) Date of Patent: Oct. 28, 2008

(54) SYSTEM FOR VIRTUAL FROST SENSOR

(75) Inventor: James C. Durand, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 279 days.

(21) Appl. No.: 11/393,947

(22) Filed: Mar. 31, 2006

(65) Prior Publication Data

US 2007/0234792 A1 Oct. 11, 2007

(51) Int. Cl.
*G01W 1/00* (2006.01)
*G08B 23/00* (2006.01)
*F02B 33/00* (2006.01)
*F02M 25/07* (2006.01)

(52) U.S. Cl. .............. 73/170.26; 123/563; 123/568.12; 340/581

(58) Field of Classification Search ............ 123/568.11, 123/568.12, 568.16, 563; 73/117.3; 340/580, 340/581
See application file for complete search history.

(56) References Cited

U.S. PATENT DOCUMENTS

| | | | |
|---|---|---|---|
| 2,766,619 A | 10/1956 | Tribus et al. | |
| 2,874,259 A | 2/1959 | Morris | |
| 3,596,263 A | 7/1971 | Ciemochowski | |
| 4,347,711 A | 9/1982 | Noe et al. | |
| 4,379,227 A | 4/1983 | Kovacs | |
| 5,241,940 A | 9/1993 | Gates, Jr. | |
| 5,586,448 A | 12/1996 | Ikeda et al. | |
| 6,463,735 B2 * | 10/2002 | Morinaga et al. | 60/277 |
| 7,100,584 B1 * | 9/2006 | Bruestle et al. | 123/563 |
| 2004/0231410 A1 | 11/2004 | Bernard et al. | |
| 2006/0054111 A1 * | 3/2006 | Hansson et al. | 123/41.01 |
| 2006/0236987 A1 * | 10/2006 | Guerrero | 123/542 |
| 2007/0010020 A1 * | 1/2007 | Elfvik et al. | 436/37 |
| 2007/0137594 A1 * | 6/2007 | Boudard et al. | 123/41.57 |

* cited by examiner

*Primary Examiner*—Stephen K. Cronin
*Assistant Examiner*—Arnold Castro
(74) *Attorney, Agent, or Firm*—Finnegan, Henderson, Farabow, Garrett & Dunner

(57) ABSTRACT

A system for a virtual frost sensor is disclosed including a method for operating the virtual frost sensor. The method includes determining a first temperature indicative of a fluid upstream of the component and determining a second temperature indicative of a fluid downstream of the component. The method also includes sensing at least one engine parameter and determining a first parameter as a function of the at least one engine parameter. The method further includes determining a third temperature indicative of a temperature associated with the engine component as a function of the first temperature, the second temperature, and the first parameter.

20 Claims, 2 Drawing Sheets

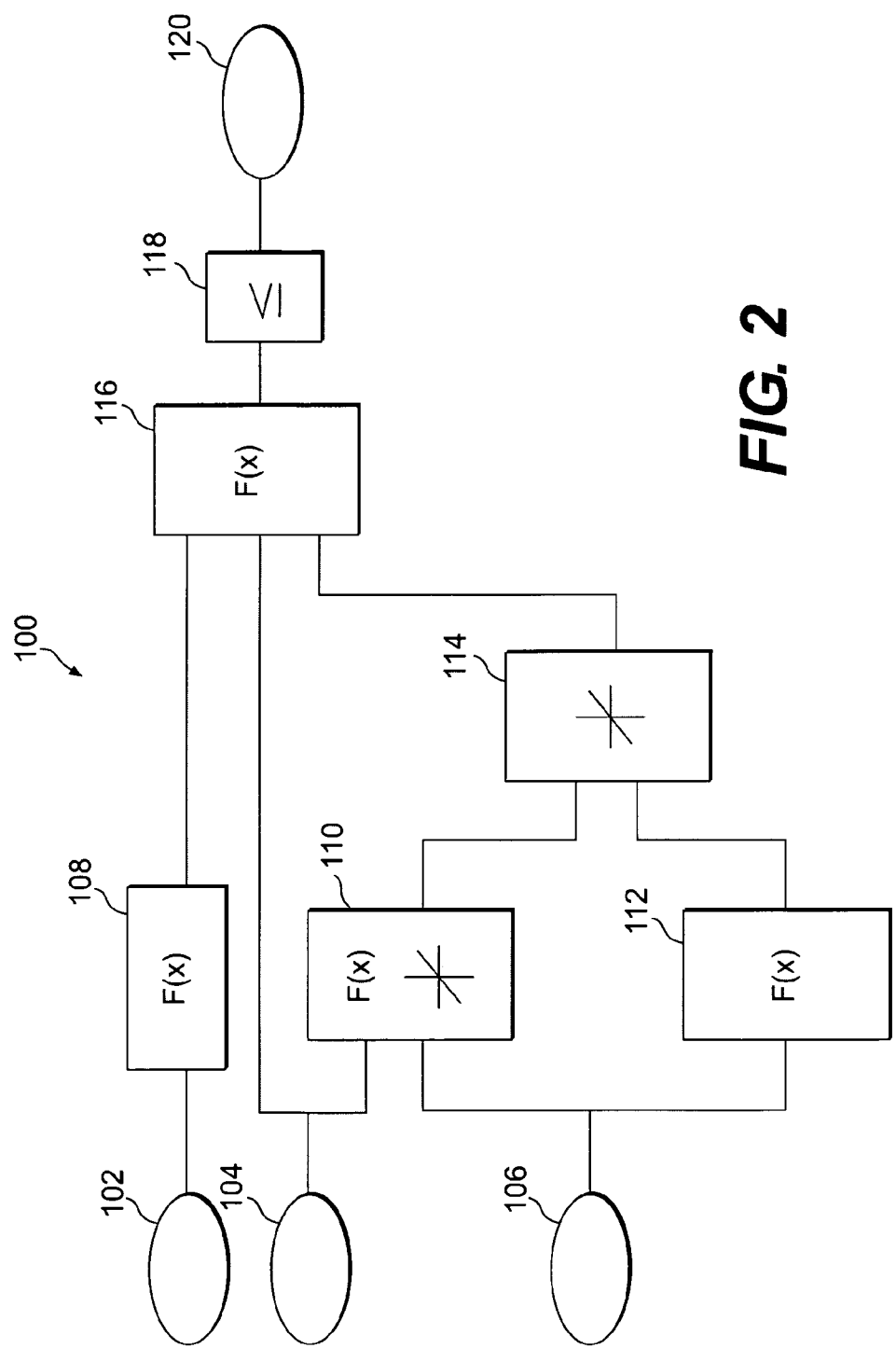

SYSTEM FOR VIRTUAL FROST SENSOR

TECHNICAL FIELD

The present disclosure relates to a system for a virtual frost sensor system and, more particularly, to a method and apparatus for a virtual frost sensor.

BACKGROUND

Turbocharged and/or supercharged engine systems typically include a compressor and an air cooler upstream of one or more combustion chambers of an engine. Often, combustion air comprises a mixture of ambient air and recirculated exhaust gas in an attempt to reduce undesirable emissions produced during combustion. Usually, an air cooler is exposed to and utilizes ambient air to cool the combustion air heated by a compressor. Recirculated exhaust gas often includes considerable amounts of water vapor and, in relatively cold environments, the air cooler may lower the temperature of the combustion air below the freezing point of water resulting in frost developing on the inside wall surface of the air cooler. Frost may increase the pressure drop across the air cooler and may adversely and/or undesirably influence engine performance.

U.S. Pat. No. 3,596,263 ("the '263 patent") issued to Ciemochowski discloses an icing condition detection apparatus. The apparatus of the '263 patent includes a first transducer sensing surface temperature of an air intake of a gas turbine engine, a second transducer sensing ambient air temperature, and a third transducer determining humidity. The signals produced by the first, second, and third transducers are delivered to a logic circuit that outputs a control signal to effect operation of a valve controlling exhaust gas recirculation. The logic circuit determines if the surface temperature of the air intake is below a freezing temperature for water and below a dew point of the ambient air. If so, the valve is opened to allow heated exhaust gases to be recirculated to the air intake of the gas turbine engine to increase the surface temperature of the air intake and thus reduce the formation of frost thereon.

Although the apparatus of the '263 patent may determine when frost is likely to occur on the surface of the air intake, the apparatus includes a transducer disposed on the surface of the air intake that may decrease the integrity thereof and/or require a complicated mechanical arrangement. Additionally, by recirculating high temperature exhaust gas to heat the air intake surface, the apparatus of the '263 patent may expose exhaust gas including a considerable amount of water vapor across a relatively cold surface thereby potentially increasing the formation of frost. Furthermore, if the recirculated exhaust gas includes after treatment to lower the temperature of the exhaust gas, e.g., to reduce particulates and/or to protect compressor components, the exhaust gas may have a relatively low temperature and may insufficiently heat the air intake surface.

The present disclosure is directed to overcoming one or more of the shortcomings set forth above.

SUMMARY OF THE INVENTION

In one aspect, the present disclosure is directed to a method for operating a virtual frost sensor with respect to an engine component. The method includes determining a first temperature indicative of a fluid upstream of the component and determining a second temperature indicative of a fluid downstream of the component. The method also includes sensing at least one engine parameter and determining a first parameter as a function of the at least one engine parameter. The method further includes determining a third temperature indicative of a temperature associated with the engine component as a function of the first temperature, the second temperature, and the first parameter.

In another aspect, the present disclosure is directed to a virtual frost sensor for an engine system having an air cooler. The virtual frost sensor includes first and second sensors configured to produce first and second signals indicative of first and second temperatures, respectively. The virtual frost sensor also includes a third sensor configured to produce a third signal indicative of at least one parameter of an engine system. The virtual frost sensor further includes a controller configured to receive the first, second, and third signals and determine a third temperature indicative of an inner wall temperature of the air cooler as a function of the first, second, and third signals.

In yet another aspect, the present disclosure is directed to a method for controlling exhaust gas recirculation with respect to an engine. The method includes sensing a first temperature indicative of ambient air downstream of an air filter and sensing a second temperature indicative of combustion air downstream of an air cooler. The method also includes sensing at least one parameter indicative of an operation of the engine and determining a third temperature indicative of a temperature of an inner wall of the air cooler as a function of the first temperature, second temperature, and the at least one parameter. The method further includes comparing the third temperature with a predetermined temperature and selectively limiting an amount of exhaust gas recirculated from downstream of the engine to the air cooler if the third temperature is less than the predetermined temperature.

BRIEF DESCRIPTION OF THE DRAWINGS

FIG. 2 is a schematic illustration of an exemplary control algorithm configured to be performed by the controller of FIG. 1.

DETAILED DESCRIPTION

Figure 1:
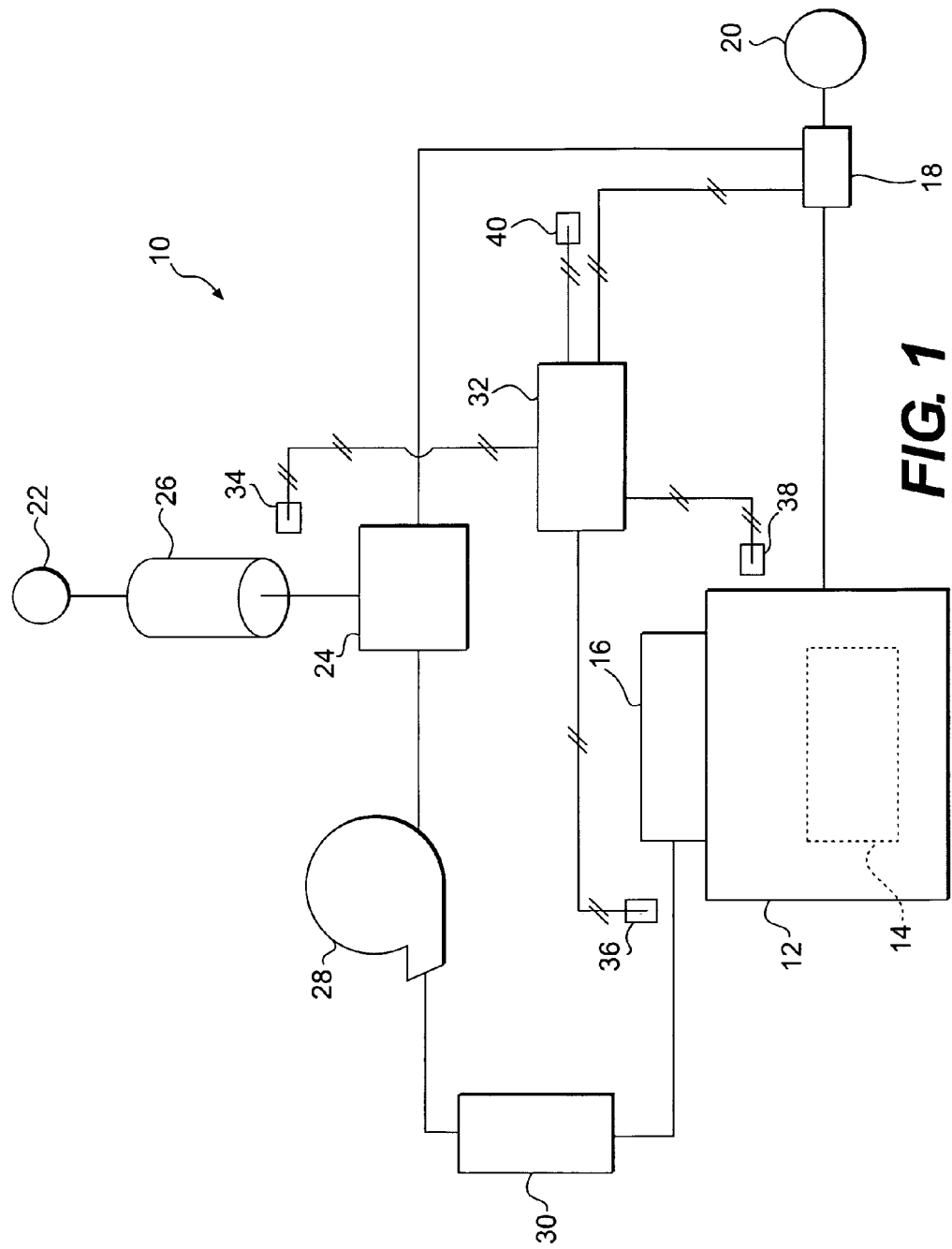
FIG. 1 is a schematic illustration of an exemplary engine system including a virtual frost sensor in accordance with the present disclosure.

FIG. 1 illustrates an exemplary engine system 10. Engine system 10 may include an engine 12 having a combustion chamber 14 and an inlet manifold 16. Engine 12 may be configured to transform potential chemical energy, e.g., fuel, into mechanical energy, e.g., torque, via a combustion process, e.g., a two or four cycle piston-cylinder combustion arrangement. Exhaust gas may be directed from combustion chamber 14 toward an environment 20 for release thereto. A portion of the exhaust gas may selectively be directed to a mixer 24 via a valve 18. Valve 18 may include a solenoid actuated variable output valve configured to divert a portion of the exhaust gas produced within combustion chamber 14 toward mixer 24. Engine system 10 may also include an air filter 26 configured to filter air received from an environment 22 and direct the filtered air toward mixer 24. Environments 20 and 22 may be the same or different environments and may, for example, include ambient air at any ambient condition. The recirculated exhaust gas, diverted via valve 18, and the filtered air, directed from filter 26, may be combined within mixer 24 to establish combustion air directed toward combustion chamber 14. The combustion air may be compressed via a compressor 28, directed through an air cooler 30 to reduce temperature, directed to inlet manifold 16, and subsequently communicated to combustion chamber 14.

It is contemplated that each of the components of engine system 10 described above may embody and/or include any conventional type of component known in the art, such as, for example, an internal combustion engine, e.g., a gasoline or diesel engine, an air filter including a fibrous fabric particulate filter, a gas mixing device, e.g., a pipe union, a heat exchanger, e.g., an air or liquid cooled heat exchanger, and/or a turbocharged or supercharged compressor system. Accordingly, such components are not described in greater detail. It is also contemplated that engine system 10 may include any quantity of additional components known in the art, such as, for example, one or more fans (not shown), an exhaust gas cooler, (not shown), an exhaust gas particulate filter (not shown), a muffler (not shown), and/or a catalytic converter (not shown).

Engine system 10 may further include a controller 32 configured to virtually sense frost within air cooler 30 and further configured to control valve 18 to selectively effect an amount of exhaust gas diverted toward mixer 24. Controller 32 may include one or more microprocessors, a memory, a data storage device, a communications hub, and/or other components known in the art. It is contemplated that controller 32 may be integrated within a general control system capable of controlling additional functions of engine system 10, e.g., selective control of engine 12, and/or additional systems operatively associated with engine system 10, e.g., selective control of a transmission system. Controller 32 may be configured to receive input signals from a plurality of sensors 34, 36, 38, 40, perform one or more algorithms to determine appropriate output signals, and may deliver the output signals to valve 18. It is contemplated that controller 32 may receive and deliver signals via one or more communication lines (not referenced) as is known in the art.

Sensors 34, 36, 38, 40 may include any conventional sensor configured to establish a signal indicative of a physical parameter. Specifically, sensor 34 may include a temperature sensor configured to produce a signal indicative of a temperature of the filtered air downstream of air filter 26. Sensor 36 may include a temperature sensor configured to produce a signal indicative of a temperature of the combustion air directed toward inlet manifold 16. Sensor 38 may include one or more sensors each configured to produce one or more signals indicative of various engine parameters, such as, for example, engine speed, fuel rate, coolant temperature, and/or any other parameter known in the art. Sensor 40 may include one or more sensors each configured to produce one or more signals indicative of various parameters of engine system 10, such as for example, a mass flow rate, e.g., of exhaust gas directed toward mixer 24 or of combustion air directed toward air cooler 30, temperature, e.g., compressor outlet temperature or ambient air temperature, pressure, e.g., ambient air pressure, and/or any other parameter of engine system 10, as desired. It is contemplated that sensors 34, 36 may be disposed at any location respectively upstream and downstream of air cooler 30, and are shown at particular locations for exemplary purposes only.

FIG. 2 illustrates an exemplary control algorithm 100. Control algorithm 100 may be performed by controller 32 to virtually sense frost within air cooler 30 and determine an output 120, as a function of the virtually sensed frost. Output 120 may influence the control and/or operation of valve 18 and, correspondingly, the amount of exhaust gas recirculated toward inlet manifold 16. Control algorithm 100 may include receiving a plurality of inputs 102, 104, 106, from sensors 34, 36, 38, 40, performing a plurality of functional relations, e.g., algorithms, equations, subroutines, look-up maps, tables, and/or comparisons, 108, 110, 112, 114, 116, 118, and establishing an output, e.g., output 120, to influence the operation of valve 18.

Inputs 102 and 104 may include a signal configured to be indicative of a temperature of filtered air downstream of air filter 26 and upstream of mixer 24 and a temperature of combustion air downstream of air cooler 30, respectively. Additionally, input 106 may include one or more signals indicative of one or more engine parameters and/or engine system parameters, e.g., signals from sensors 38 and/or 40. Inputs 102, 104, 106 may embody any signal, such as, for example, a pulse, a voltage level, a digital signal, a magnetic field, a digital input, a sound or light wave, and/or other signal format known in the art.

Functional relation 108 may be configured to determine a temperature of the ambient air directed from environment 22 through air filter 26. Functional relation 108 may functionally relate the temperature of the filtered air, e.g., input 102, with predetermined ambient temperatures. For example, functional relation 108 may multiply input 102 by a predetermined factor indicative of an effect air filter 26 may have on the temperature of ambient air directed therethrough. It is contemplated that functional relation 108 may include any mathematical relation, e.g., addition, subtraction, division, raising to powers, to functionally relate filtered air temperature and ambient air temperatures. It is also contemplated that the ambient air temperature may, alternatively, be determined via a sensor suitably disposed with respect to environment 22 and configured to produce a signal indicative of an ambient air temperature.

Functional relation 110 may be configured to determine a mass flow rate of combustion air directed toward or through air cooler 30. Functional relation 110 may functionally relate the temperature of combustion air directed toward manifold 16, e.g., input 104, with one or more engine 12 or engine system 10 parameters, e.g., input 106. For example, functional relation 110 may functionally relate combustion air temperature, engine speed, fuel consumption, valve timing, and/or ambient air pressure, within one or more predetermined relationships to determine the air cooler mass flow rate. It is contemplated that the air cooler mass flow rate may, alternatively, be determined via a sensor suitably disposed with respect to air cooler 30 and configured to produce a signal indicative of a mass flow rate thereof.

Functional relation 112 may be configured to determine a rated mass flow rate of air cooler 30. Functional relation 112 may functionally relate one or more engine 12 and/or engine system 10 parameters, e.g., input 106, with predetermined mass flow rates. For example, functional relation 112 may functionally relate engine speed, engine load, and one or more predetermined rated mass flow rates, within one or more predetermined relationships to determine the rated air cooler mass flow rate. It is contemplated that the rated air cooler mass flow rate may be indicative of the mass flow rate of combustion air directed toward or through air cooler 30 for a given engine speed and load. It is also contemplated that the rated air cooler mass flow rate may be determined as a function of empirically determined flow rates for given engine speeds and loads.

Functional relation 114 may be configured to determine a parameter indicative of a temperature factor for an inner wall of air cooler 30. Specifically, the parameter may include a factor indicative of the effect the combustion air and the ambient air may have on a temperature of the inner surface wall of air cooler 30, e.g., a wall surface exposed to the combustion air. The parameter may be indicative of a wall ratio and may be determined as a function of one or more parameters associated with air cooler 30, such as, for example, space velocity, vehicle speed, fluid flow dynamics, heat exchange efficiency, and/or any other parameter known in the art to influence wall temperature within a heat exchange device. For example, functional relation 114 may functionally relate the air cooler mass flow rate and the rated air cooler mass flow rate with one or more predetermined parameters via one or more relational maps to establish the wall ratio. It is contemplated that functional relation 114 may include a three-dimensional map representative of, for example, $k_1(M_{ac}/M_{rtd})-k_2$; wherein $k_1$ and $k_2$ represent constants, $M_{ac}$ represents the air cooler mass flow rate, and $M_{rtd}$ represents the rated air cooler mass flow rate. It is contemplated that functional relation 114 may include any mathematical relation, e.g., linear or exponential, and that constants $k_1$ and/or $k_2$ may be any suitable constant, e.g., an empirically determined parameter. It is also contemplated that the wall ratio may be represented as a fractional relationship, e.g., the wall ratio may be a dimensionless parameter defined within a range, such as, for example, greater than or equal to zero and less than or equal to one. It is further contemplated that an established wall ratio may vary as a function of changing parameters associated with air cooler 30.

Functional relation 116 may be configured to determine a temperature indicative of a surface wall temperature of air cooler 30. Specifically, the wall temperature may be determined as a function of the ambient air temperature, the combustion air temperature, and the wall ratio. For example, functional relation 116 may functionally relate the ambient air temperature, e.g., the lowest temperature that the wall of the air cooler might include, with the wall ratio and the difference between the combustion temperature, e.g., the highest temperature that the wall of the air cooler might include, and the ambient air temperature. It is contemplated that functional relation 116 may include a mathematical relationship representative of, for example, $T_{wall}=T_{atm}+W_{ratio}(T_{man}-T_{atm})$; wherein $T_{wall}$ represents the wall temperature, $T_{atm}$ represents the ambient air temperature, $W_{ratio}$ represents the wall ratio, and $T_{man}$ represents the combustion air temperature. It is noted that the inner surface of the wall of air cooler 30 may include a temperature gradient from the inlet of air cooler 30 to the outlet of air cooler 30. As such, it is contemplated that the wall temperature, determined within functional relation 116, may be indicative of the lowest temperature point along such a temperature gradient. It is also contemplated that the temperature of the combustion air, as determined from input 104, may be indicative of the temperature of the combustion air at the outlet of air cooler 30. As such, the temperature of the combustion air may be determined at any location relative to the outlet of air cooler 30.

Functional relations 108, 110, 112, 114, 116 may each include one or more relational maps that may be in the form of, for example, a two- or three-dimensional look-up table and/or one or more equations. Specifically, functional relations 108, 110, 112, 116 may each include an equation functionally relating respective input signals 102, 104, 106 with predetermined parameters, variables, values, and/or factors to determine specific parameters of engine system 10, e.g., ambient air temperature, mass flow rate of air cooler 30, and rated mass flow rate of engine system 10. Additionally, functional relation 114 may include a relational map, e.g., one or more two- or three-dimensional maps, functionally relating air cooler mass flow rates and rated mass flow rates with predetermined parameters, variables, values, and/or factors to determine a specific wall ratio for air cooler 30. It is contemplated that the wall ratio may be variable as a function of changing engine 12 and/or engine system 10 conditions, such as, for example, changing ambient temperature, changing engine parameters, and/or other variables associated with operating engine system 10. It is also contemplated that interpolation and/or an equation may be used to relate air cooler mass flow rate and rated mass flow rate within the look-up tables associated with functional relation 114. It is further contemplated that functional relations 108, 110, 112, 114, 116, may each be populated with data determined from test equipment, data from predetermined relationships, data selected or desired by one or more operators, and/or data determined by any other suitable manner.

Functional relation 118 may be configured to compare the wall temperature with a predetermined value and may establish output 120 as a function thereof. Functional relation 118 may include one or more equations configured to functionally relate the wall temperature and the predetermined value to determine if the wall temperature is greater than the predetermined value and may establish output 120 as a function of thereof. For example, if the wall temperature is less than or equal to the predetermined value, output 120 may, via controller 32, limit, e.g., prohibit or discontinue, exhaust gas recirculation by, for example, effecting valve 18 to close or remain closed. Similarly, if the wall temperature is greater than the predetermined value, output 120 may not, via controller 32, limit exhaust gas recirculation. It is contemplated that output 120 may be configured as a flag criteria and, as such, may be configured to influence exhaust gas recirculation only when the wall temperature is less than or equal to the predetermined value. It is also contemplated that the predetermined value may be any value below which exhaust gas recirculation is desired to be limited, such as, for example, a value indicative of a freezing temperature of water, and may or may not include a margin of error, e.g., a percentage or fixed value increase to account for mathematical rounding discrepancies and/or other computational inaccuracies as is known in the art. As such, controller 32, sensors 34, 36, 38, 40, and control logic 100, may virtually sense frost within air cooler 30 and influence control of engine system 10 to limit the recirculation of exhaust gas when frost may be likely within air cooler 30. It is further contemplated that output 120 may influence the additional algorithms performed by controller 32, e.g., output 120 may be an input into an algorithm configured to determine an output signal configured to effect movement of valve 18 and thus an amount of exhaust gas recirculation.

INDUSTRIAL APPLICABILITY

The disclosed system for a virtual frost sensor may be applicable to virtually sense the formation of frost with respect to an engine component. The disclosed system for a virtual frost sensor may virtually sense, e.g., predict, the formation of frost within an air cooler and may allow a controller to limit an amount exhaust gas recirculated as a function thereof. The operation of engine system 10 and, in particular, control algorithm 100 will be explained below.

Engine system 10 may be associated with and configured to provide power to any device known in the art, such as, for example, a mobile vehicle, a marine vessel, and/or a generator. Accordingly, engine system 10 may operate in varying and significantly different environments, including, for example, cold climates. In cold climates, an ambient temperature of atmospheric air might be approximately equal to or significantly lower than the freezing point of water. It is noted that the ambient air in cold climates typically includes small amounts of water vapor because of the effects of the dew point, however, exhaust gas produced as a by-product of a combustion process may include considerable amounts of water vapor. It is also noted that if water vapor contacts an object having a surface temperature below the freezing point, the water vapor is likely to freeze and form frost on the surface.

Referring to FIG. 1, air cooler 30 may be configured to reduce a temperature of combustion air downstream of compressor 28 and upstream of inlet manifold 16. Air cooler 30 may be exposed to the ambient air associated with a cold climate and may, for example, utilize forced ambient air to cool the combustion air via a suitable heat exchanging device, e.g., an air cooler with fan forced air. As such, the wall surface of air cooler 30 exposed to the combustion air may include a temperature below a predetermined value, e.g., below a freezing temperature of water, and frost may form. The existence of frost may adversely and/or undesirably influence the operation of air cooler 30 and engine system 10 by, for example, increasing a pressure drop across air cooler 30, reducing the amount of combustion air directed toward inlet manifold 16, burdening compressor 28, and/or increasing an amount of energy utilized to supply combustion air toward manifold 16 and subsequently to combustion chamber 14.

Controller 32 may receive a plurality of inputs from sensors 34, 36, 38, 40, perform one or more algorithms, e.g., control algorithm 100 and/or additional algorithms, and output a control signal to valve 18. It is contemplated that the additional algorithms may be configured to determine operational output signals to control valve 18, e.g., effect the degree and/or timing of the opening and/or closing of valve 18, as a function of one or more parameters of engine 12, engine system 10, and/or predetermined or desired relationships. As such, control algorithm 100 may be integrated, e.g., as an input or a subroutine, within one or more of the additional algorithms, performed independently of the additional algorithms, and/or configured to limit exhaust gas recirculation by manipulating, e.g., overriding, an operational control signal for valve 18. It is also contemplated that control algorithm 100 may prohibit exhaust gas recirculation by prohibiting valve 18 from opening, e.g., prohibiting controller 32 from communicating an output signal to valve 18 to move valve 18 from a closed position toward an open position, and may discontinue gas recirculation by moving valve 18 toward a closed position, e.g., influencing controller 32 to communicate an output signal to valve 18 to move valve 18 from an open position toward a closed position. It is contemplated that the additional algorithms configured to effect movement of valve 18 may determine an output signal as a function of any desired parameter, e.g., a parameter of engine 12, engine system 10, and/or a predetermined relationship.

Referring to FIG. 2, control algorithm 100 may receive input signals 102, 104, 106 indicative of the filtered air temperature, the combustion air temperature, and one or more engine 12 and/or engine system 10 parameters, respectively. Control algorithm 100 may determine, as a function of the received input signals, an ambient temperature, 108, an air cooler mass flow rate, 110, and a rated air cooler mass flow rate, 112. Control algorithm 100 may also determine a wall ratio, 114, as a function of the air cooler mass flow rate and the rated air cooler mass flow rate. Control algorithm 100 may further determine a wall temperature, 116, as a function of the ambient temperature, the combustion air temperature, and the wall ratio, compare the wall temperature with a predetermined value, 118, and establish output 120 as a function thereof.

For example, control algorithm 100 may determine the wall temperature to be substantially equal to 30° F. and may compare the wall temperature with a predetermined value substantially equal to 32° F. As such, control algorithm 100 may determine that frost is likely to occur within air cooler 30, e.g., virtually sense frost within air cooler 30, because 30° F. is less than 32° F. Accordingly, control valve 18 (see FIG. 1) may be limited, if not already controlled to divert exhaust gas toward mixer 24, or may be discontinued, if already controlled to divert exhaust gas toward mixer 24 to reduce an amount of water vapor directed through air cooler 30 and reduce the formation of frost therein. It is contemplated that controller 32 and control algorithm 100 may be performed with respect to any desired set of units, e.g., ° F. or ° C. It is also contemplated that control algorithm 100 may be performed continuously, periodically, with or without a uniform frequency, and/or singularly. It is further contemplated that control algorithm 100 may include a decision step (not shown) configured to determine whether control algorithm 100 should be performed, e.g., determine if the ambient temperature is below a freezing temperature for water. For example, such a decision step may decide that control algorithm 100 may not need to be performed because the ambient air temperature is significantly above the freezing temperature for water, e.g., engine system 10 is not operated within a significantly cold climate.

Because control algorithm 100 virtually determines frost with respect to an engine component surface, the integrity of the component may be preserved and/or a complex mechanical arrangement may not be necessary to determine a surface temperature. Additionally, by controlling the recirculation of exhaust gas as a function of the virtually sensed frost, control algorithm 100 may reduce the amount of frost formed on an engine component and thus may reduce adverse effects with respect to engine performance.

It will be apparent to those skilled in the art that various modifications and variations can be made to the disclosed system for a virtual frost sensor. Other embodiments will be apparent to those skilled in the art from consideration of the specification and practice of the disclosed system. It is intended that the specification and examples be considered as exemplary only, with a true scope being indicated by the following claims and their equivalents

What is claimed is:

1. A method for operating a virtual frost sensor with respect to an engine component comprising:
   determining a first temperature indicative of a fluid upstream of the component;
   determining a second temperature indicative of a fluid downstream of the component;
   sensing at least one engine parameter;
   determining a first parameter as a function of the at least one engine parameter; and
   determining a third temperature indicative of a temperature associated with the engine component as a function of the first temperature, the second temperature, and the first parameter.

2. The method of claim 1, wherein the first parameter is indicative of an effect the first temperature and the second temperature have on a temperature of a wall surface of the component.

3. The method of claim 1, wherein determining the first temperature includes sensing a temperature of air downstream of an air filter.

4. The method of claim 1, wherein determining the second temperature includes sensing a temperature of fluid delivered to an inlet manifold of a combustion engine.

5. The method of claim 1, wherein determining the first parameter includes determining:

a first mass flow rate indicative of the mass flow rate of fluid directed through the engine component;

a second mass flow rate indicative of a mass flow rate of fluid directed through the engine component as a function of predetermined engine loads and speeds; and the first parameter via a look-up table as a function of the first and second mass flow rates.

6. The method of claim 5, further including determining the first mass flow rate as a function of at least one of an engine speed, an engine load, a engine valve timing, or a fuel consumption.

7. A virtual frost sensor for an engine system having an air cooler comprising:

first and second sensors configured to produce first and second signals indicative of first and second temperatures, respectively;

a third sensor configured to produce a third signal indicative of at least one parameter of an engine system; and a controller configured to:
receive the first, second, and third signals; and
determine a third temperature indicative of an inner wall temperature of the air cooler as a function of the first, second, and third signals.

8. The virtual frost sensor of claim 7, wherein the controller is further configured to:

determine first and second mass flow rates as a function of the third signal, the first mass flow rate indicative of the mass flow rate of combustion air directed through the air cooler and the second mass flow rate indicative of a mass flow rate of the air cooler with respect to predetermined mass flow rates associated with predetermined engine speeds and loads.

9. The virtual frost sensor of claim 8, wherein the at least one engine parameter includes at least one of an engine speed, an engine load, an engine valve timing, or a fuel consumption, and the controller is further configured to:

determine a first parameter as a function of the first and second mass flow rates, the first parameter indicative of an effect the first temperature and the second temperature have on a temperature of a wall surface of the air cooler; and determine the third temperature as a function of the first parameter.

10. The virtual frost sensor of claim 7, wherein the virtual frost sensor is operatively associated within an engine system including an air filter and an engine having an inlet manifold.

11. The virtual frost sensor of claim 10, wherein:

the first signal is indicative of a temperature downstream of the air filter;

the second signal is indicative of a temperature upstream of the inlet manifold; and the third signal is indicative of at least one of an engine speed, a valve timing, or a fuel consumption.

12. The virtual frost sensor of claim 10, wherein the engine system further includes the air cooler disposed upstream of the engine wherein the controller is further configured to:

determine a fourth temperature indicative of a temperature of an atmosphere surrounding the air cooler as a function of the first signal;

determine a first mass flow rate indicative of the mass flow rate of combustion air directed through the air cooler as a function of the third signal;

determine a first parameter as a function of the first mass flow rate; and determine the third temperature as a function of the fourth temperature and the first parameter.

13. The virtual frost system of claim 12, wherein:

the second temperature is indicative of a temperature of combustion air within the inlet manifold; and the controller is configured to determine the third temperature as a function of the fourth temperature, the first parameter, and the second temperature.

14. The virtual frost system of claim 13, wherein determining the first parameter includes the controller accessing at least one relational map.

15. A method for controlling exhaust gas recirculation with respect to an engine comprising:

sensing a first temperature indicative of ambient air downstream of an air filter;

sensing a second temperature indicative of combustion air downstream of an air cooler;

sensing at least one parameter indicative of an operation of the engine;

determining a third temperature indicative of a temperature of an inner wall of the air cooler as a function of the first temperature, second temperature, and the at least one parameter; and comparing the third temperature with a predetermined temperature and selectively limiting an amount of exhaust gas recirculated from downstream of the engine to the air cooler if the third temperature is less than the predetermined temperature.

16. The method of claim 15, further including sensing the first temperature, the second temperature, and the at least one parameter with first, second, and third sensors, respectively.

17. The method of claim 15, wherein the ambient air and the recirculated gas are combined upstream of the air cooler to form combustion air, the method further including:

determining a fourth temperature indicative of a temperature of the ambient air upstream of the air filter as a function of the first temperature;

determining a first mass flow rate indicative of a mass flow rate of combustion air directed to the air cooler;

determining a second mass flow rate indicative of a predetermined mass flow rate of the air cooler with respect to a predetermined engine speed and load; and wherein determining the third temperature includes determining the third temperature as a function of the fourth temperature and the first and second mass flow rates.

18. The method of claim 17, further including determining a second parameter indicative of a temperature factor of a wall of the air cooler as a function of the first and second mass flow rates.

19. The method of claim 18, wherein determining the third temperature includes determining the third temperature as a function of the fourth temperature, second temperature, and the second parameter.

20. The method of claim 15, wherein the at least one parameter indicative of an operation of the engine includes at least one of an engine speed, an engine load, an engine valve timing, or a fuel consumption, the method further including:

determining a second parameter as a function of the second temperature and the at least one parameter, an effect the first temperature and the second temperature have on a temperature of a wall surface of the air cooler; and determining the third temperature as a function of the second parameter.

* * * * *